Aug. 1, 1967
G. A. BESSETTE
3,333,439
SELF-LOCKING GUARD
Filed Oct. 22, 1965
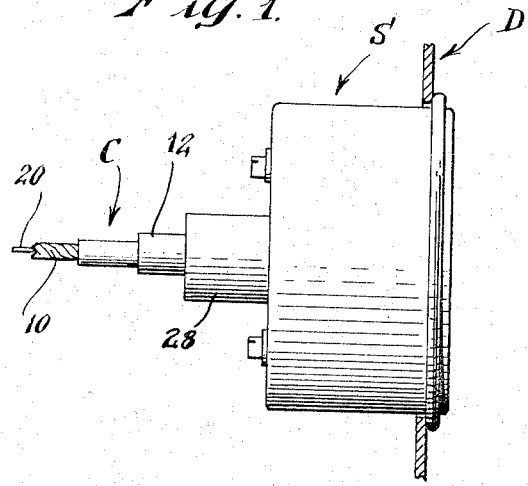
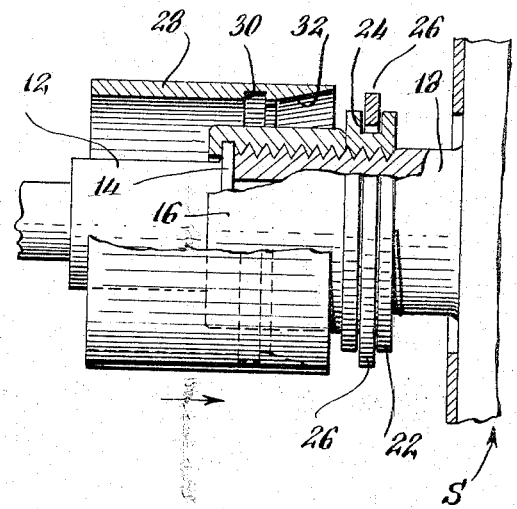
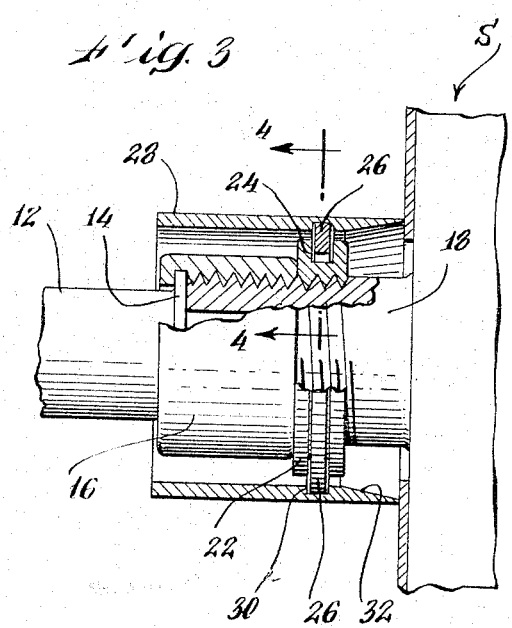
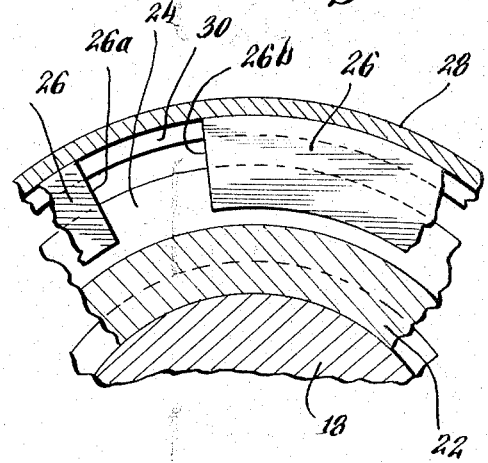
INVENTOR.
BY George A. Bessette
Wooster, Davis & Cifelli
ATTORNEYS.

United States Patent Office 3,333,439
Patented Aug. 1, 1967

3,333,439
SELF-LOCKING GUARD
George A. Bessette, 93 Fiske St., Fairfield, Conn. 06430
Filed Oct. 22, 1965, Ser. No. 501,548
5 Claims. (Cl. 64—3)

ABSTRACT OF THE DISCLOSURE

A guard for a separable coupler such as that employed to connect a speedometer shaft to a speedometer. An annular locking ring having a circumferential groove is retained between the coupler and the speedometer stud. A retaining spring is loosely mounted in the groove. A cylindrical sleeve is mounted over the coupler and includes an internal groove for receiving the spring.

---

This invention relates to a self-locking guard and, more particularly, to a guard for preventing the disconnection of speedometer cables.

Correct readings on motor vehicle odometers often carry with them important financial considerations. This is particularly true of car and truck rental agencies which base their charges upon mileage, and of automobile manufacturers and dealers whose guarantees are often expressed in terms of mileage. Many other firms and individuals whose financial interest are dependent on odometer readings will also come to mind.

It is not uncommon for unscrupulous persons to disconnect the speedometer cable from a speedometer so as to prevent the odometer from recording. Accordingly, it is a primary object of this invention to provide a self-locking and nonremovable guard to prevent the speedometer cable from being disconnected from the speedometer. Other objects are to provide such a guard which is inexpensive to manufacture and simple to install. Other objects, features and advantages will be apparent from the following description, the appended claims and the figures of the attached drawing, wherein:

FIG. 1 is a side view of a speedometer and speedometer cable, upon which is installed a guard in accordance with the present invention;

FIG. 2 is an enlarged illustration, partially broken away, of the speedometer cable connection showing the manner of installing the guard of this invention;

FIG. 3 is a view similar to FIG. 2, showing the guard completely installed; and

FIG. 4 is an enlarged cross section taken substantially along the line 4—4 of FIG. 3, illustrating a portion of the locking mechanism of the guard.

The objects of this invention are achieved by means of a guard for a separable coupler having a first coupling member engageable with a second coupling member, including an annular locking ring which is retained by the coupler. A cylindrical sleeve is provided which defines a circumferential groove on its inner surface and is positionable over the coupler. A retaining spring is also provided which is biased radially outward so as to engage both the locking ring and the groove to prevent withdrawal of the sleeve from the coupler.

With particular reference to the drawing, there is illustrated in FIG. 1 a speedometer S secured to a dashboard D and connected to the usual speedometer cable C. The cable C includes a flexible cable housing 10 secured at its end to a connector 12 which terminates in an annular flange 14 (FIG. 2). An internally threaded bushing 16 rotatably engages the flange 14 and is normally threaded directly onto a stud 18 which extends from the rear of the speedometer. The rotating shaft 20 extends into the speedometer where it actuates the speedometer and odometer by means of the usual mechanism (not shown). It will thus be seen that, normally, it is quite simple to disconnect the cable by merely unscrewing the bushing 16. However, this is prevented by the guard of this invention which will now be described.

Basically, the guard consists of three parts—a locking ring, a spring, and a sleeve. The locking ring 22 is a washer-like member which has internal threads for engaging the threads of the speedometer stud 18. The outer periphery of the locking ring defines a recess 24. Loosely fitted within the recess 24 is a retaining spring 26. The internal diameter of spring 26 is greater than the bottom diameter of the recess 24 and a substantial gap exists between its ends 26a, 26b, as shown in FIG. 4.

In installing the guard of this invention, the locking ring 22 with the captured spring 26 is first screwed onto the speedometer stud 18 to the limit of the threads. The remaining portion of the guard is the cylindrical sleeve 28. The inner wall of sleeve 28 defines an annular groove 30 and the internal diameter of the ungrooved portion of the sleeve is less than the normal outside diameter of spring 26. One end of sleeve 28 is also provided with an internal camming taper 32. Although the degree of taper is not critical, it is important that the internal diameter of the sleeve at the extreme end of the taper be greater than the outer diameter of spring 26.

After the locking ring 22 has been installed on stud 18 as described above, the sleeve 28 is slipped over the end of the speedometer cable and the cable is connected to the speedometer by screwing the bushing 16 on the stud 18 and against the locking ring, as shown in FIG. 2. The sleeve 28 is then pushed toward the speedometer in the direction shown by the arrow in FIG. 2 until the camming taper 32 engages the spring 26. As the sleeve is forced further toward the speedometer, the camming taper forces the ends 26a, 26b of the spring together, forcing the spring inwardly within recess 24. The sleeve is advanced further until the groove 30 is aligned with the spring 26, whereupon the spring expands into the groove. This fully installed position is shown in FIGS. 3 and 4. It will now be apparent that the spring 26 is interlocked with both the recess 24 in locking ring 22 and with the groove 30 in sleeve 28. Accordingly, the sleeve cannot be moved from this position. As it completely covers the bushing 16, the bushing cannot be unscrewed to allow the cable to be detached from the speedometer. The only way in which the speedometer cable can now be disconnected is by destruction of sleeve 28 as by sawing. This can be made very difficult by utilizing the proper material, such as a hardened heat-treated steel, for sleeve 28. Alternatively, any other suitable materials, such as aluminum, could also be used.

Although the specifically described embodiment of this invention pertains to its use in protecting a speedometer cable, its applications are not so limited. It may also be employed for protecting many other types of couplers. Furthermore, a plastic or paperboard sleeve could be used. Actual protection would be minimal but unauthorized tampering would be readily apparent.

It will be apparent to those skilled in the art that the present invention accomplishes all the objectives set forth above. It will also be apparent that many variations and modifications may be made therein without departing from its spirit and scope. Accordingly, the foregoing description is to be construed as illustrative only, rather than limiting. This invention is limited only by the scope of the followings claims.

What I claim as new and desire to secure by Letters Patent of the United States is:

1. A guard for a separable coupler having a first coupling member selectively engageable with a second coupling member which comprises: annular locking ring means retained by said coupler; a cylindrical sleeve defining a circumferential groove on its inner surface and positionable over said coupler; and retaining spring means biased radially outward to engage both of said locking ring and groove to prevent withdrawal of said sleeve from said coupler.

2. The guard of claim 1 wherein said locking ring means defines a circumferential recess on its outer surface and said spring means is positioned in said recess.

3. The guard of claim 1 wherein the inner surface of said sleeve is tapered outwardly toward one end, the inner diameter at said end being greater than the outer diameter of said spring means.

4. The guard of claim 1 wherein said locking ring means is internally threaded to engage one of said coupling members.

5. A guard for a speedometer cable having a threaded bushing for engaging a threaded speedometer stud which comprises: an internally threaded annular locking ring threadedly engageable with said stud between its base and said bushing, said locking ring defining a circumferential recess on its outer surface; radially compressible retaining spring means loosely retainable in said recess and extending radially outward therefrom; and a cylindrical sleeve positionable to enclose said bushing and ring, said sleeve defining on its inner surface a circumferential groove engageable with said spring means, said inner surface being tapered outwardly toward one end, the inner diameter at said end being greater than the outer diameter of said spring means.

References Cited
UNITED STATES PATENTS

| | | | |
|---|---|---|---|
| 1,604,690 | 10/1926 | Halaby | 64—4 |
| 1,841,318 | 1/1932 | Earnest | 64—3 |
| 1,943,980 | 1/1934 | Mall | 64—4 |
| 2,519,828 | 8/1950 | Earnest | 64—3 |

FRED C. MATTERN, JR., *Primary Examiner.*

HALL C. COE, *Examiner.*